US011238507B2

(12) United States Patent
Nagar et al.

(10) Patent No.: US 11,238,507 B2
(45) Date of Patent: Feb. 1, 2022

(54) EXTRACTING, VALIDATING, AND CORRECTING ITEM ATTRIBUTE VALUES IN A DATABASE

(71) Applicant: INTERNATIONAL BUSINESS MACHINES CORPORATION, Armonk, NY (US)

(72) Inventors: Raghuveer P. Nagar, Kota (IN); Romil Samyal, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 276 days.

(21) Appl. No.: 16/218,461

(22) Filed: Dec. 12, 2018

(65) Prior Publication Data

US 2020/0193493 A1 Jun. 18, 2020

(51) Int. Cl.
| | |
|---|---|
| *G06Q 30/00* | (2012.01) |
| *G06Q 30/06* | (2012.01) |
| *G06K 9/46* | (2006.01) |
| *G06F 16/23* | (2019.01) |
| *G06F 40/40* | (2020.01) |

(52) U.S. Cl.
CPC ......... *G06Q 30/0603* (2013.01); *G06F 16/23* (2019.01); *G06F 40/40* (2020.01); *G06K 9/46* (2013.01); *G06Q 30/0627* (2013.01)

(58) Field of Classification Search
CPC ............ G06Q 30/0603; G06Q 30/0627; G06F 16/23; G06F 40/40; G06K 9/46
USPC .................................................... 705/26, 27
See application file for complete search history.

(56) References Cited

U.S. PATENT DOCUMENTS

| | | | |
|---|---|---|---|
| 8,417,562 B1* | 4/2013 | Siemens ............ | G06Q 30/0218 705/7.38 |
| 9,135,247 B2* | 9/2015 | Li .......................... | G06F 16/958 |

(Continued)

OTHER PUBLICATIONS

Edvinsson, J., "Machine Learning at Conde Nast, Part 2: Handbag Brand and Color Detection", [online], Nov. 3, 2017 [Retrieved on Nov. 28, 2018], Retrieved from the Internet at <URL: https://technology.condenast.com/story/handbag-brand-and-color-detection>, 12 pp.

(Continued)

*Primary Examiner* — Robert M Pond
(74) *Attorney, Agent, or Firm* — Konrad Raynes Davda & Victor LLP; David W. Victor (57) ABSTRACT

Provided are a computer program product, system, and method for extracting, validating, and correcting item attribute values in a database. Received user information indicates an incorrect database attribute value for an attribute of content in the database and a user provided attribute value for the incorrect database attribute value. A page is accessed over a network providing information on the content. A determination is made as to whether the page includes a page attribute value for the attribute of the content. A determination is made as to whether the page attribute value for the attribute of the content matches the user provided attribute value in response to determining that the page provides the page attribute value. The database is updated to use the user provided attribute value for the attribute of the content in response to determining that the page attribute value matches the user provided attribute value.

21 Claims, 5 Drawing Sheets

(56) References Cited

U.S. PATENT DOCUMENTS

| | | | | |
|---|---|---|---|---|
| 2009/0327865 A1* | 12/2009 | Li | ............... | G06F 16/00 |
| | | | | 715/234 |
| 2010/0306223 A1* | 12/2010 | Lee | ............... | G06F 16/24578 |
| | | | | 707/759 |
| 2014/0297473 A1* | 10/2014 | Singh | ............... | G06Q 10/0635 |
| | | | | 705/26.61 |
| 2014/0337247 A1* | 11/2014 | Stephens | ............... | G06Q 30/00 |
| | | | | 705/343 |
| 2016/0070742 A1* | 3/2016 | Myslinski | ............... | G06F 40/30 |
| | | | | 707/690 |
| 2017/0004178 A1* | 1/2017 | Ponting | ............... | G06F 16/685 |
| 2017/0186032 A1 | 6/2017 | Rangasamy Kannadasan et al. | | |
| 2017/0323357 A1* | 11/2017 | Le Stunff | ............... | G06F 16/285 |
| 2017/0372407 A1 | 12/2017 | Konigsberg et al. | | |
| 2020/0202073 A1* | 6/2020 | Ghulati | ............... | G06F 40/30 |

OTHER PUBLICATIONS

Pakhomova, N., "Detecting and Correcting E-Commerce Catalog Misattribution with Image and Text Classification Using Google Tensor Flow", [online], Jun. 22, 2017, [Retrieved on Nov. 29, 2018], Retrieved from the Internet at <URL: https://blog.griddynamics.com/fix-e-commerce-attribution-with-tensorflow-and-image-recognition/>, 10 pp.

Suntec, "eCommerce Catalog Management Services", [online], [Retrieved on Nov. 29, 2018], Retrieved from the Internet at <URL: http://www.suntecindia.com/ecommerce-catalog-management-services.html>, 13 pp.

* cited by examiner

EXTRACTING, VALIDATING, AND CORRECTING ITEM ATTRIBUTE VALUES IN A DATABASE

BACKGROUND OF THE INVENTION

1. Field of the Invention

The present invention relates to a computer program product, system, and method for extracting, validating, and correcting item attribute values in a database.

2. Description of the Related Art

A database may have errors that consumers of the database may notice. Errors in database information, such as having wrong attribute values for attributes of an item, such as wrong information on a product, may result in erroneous decisions by the consumer of the information. For instance, purchasing a product based on a wrong description in an online catalogue may require the seller to handle complaints and returns of items.

There is a need in the art for improved techniques for correcting errors in attribute values for items in a database.

SUMMARY

Provided are a computer program product, system, and method for extracting, validating, and correcting item attribute values in a database. Received user information indicates an incorrect database attribute value for an attribute of content in the database and a user provided attribute value for the incorrect database attribute value. A page is accessed over a network providing information on the content. A determination is made as to whether the page includes a page attribute value for the attribute of the content. A determination is made as to whether the page attribute value for the attribute of the content matches the user provided attribute value in response to determining that the page provides the page attribute value. The database is updated to use the user provided attribute value for the attribute of the content in response to determining that the page attribute value matches the user provided attribute value.

DETAILED DESCRIPTION

Errors in information in a database may result in incorrect decisions, lost opportunities and lost business. For instance, if a customer purchases a product based on a wrong description of the product in an online catalog, then the retailer will incur costs in having to handle the return and complaints. Database operators may use analytics to detect database errors, such as noticing multiple returns of an item due to "Item not as Described" reasons. The computer analytics upon noticing multiple of these returns, may then trigger a request/notification to the catalog manager to determine whether to correct the catalog. Such systems involve manual intervention to detect and make the changes, and ascertain the problem at issue.

Described embodiments provide improvements to computer technology for correcting errors in attribute values for items represented in a database by providing real-time and instant corrections by using cognitive software tools to extract user provided corrections from user information and to validate the user extracted corrections as accurate before applying the user correction to the database. This allows for real time and instant corrections of the database to avoid further decision errors based on incorrect information in the database.

Described embodiments use natural language processing and other software tools, such as audio-to-text conversion, to determine a user provided attribute value in user information for an incorrect attribute value from the database. Upon extracting the user provided correction, a page is accessed from over a network, such as the Internet, providing independent information on the content in the database having the incorrect attribute value. If the page provides an attribute value for the attribute the user information indicated as incorrect, then the user supplied correction to the attribute value is validated by determining that the page has an attribute value for the content that matches the user provided attribute value. The database is then automatically updated with the user provided attribute value for the attribute of the content in response to validating the user supplied correction.

In this way, described embodiments, provide a process/workflow to correct database attribute values upon processing user information that includes a user provided attribute value for an incorrect attribute value in the database. This allows for user corrections of the database in a crowd sourcing manner to process immediate feedback and correction if validated to avoid continued propagation of the error and lost opportunities from incorrect attribute values in the database.

Figure 1:
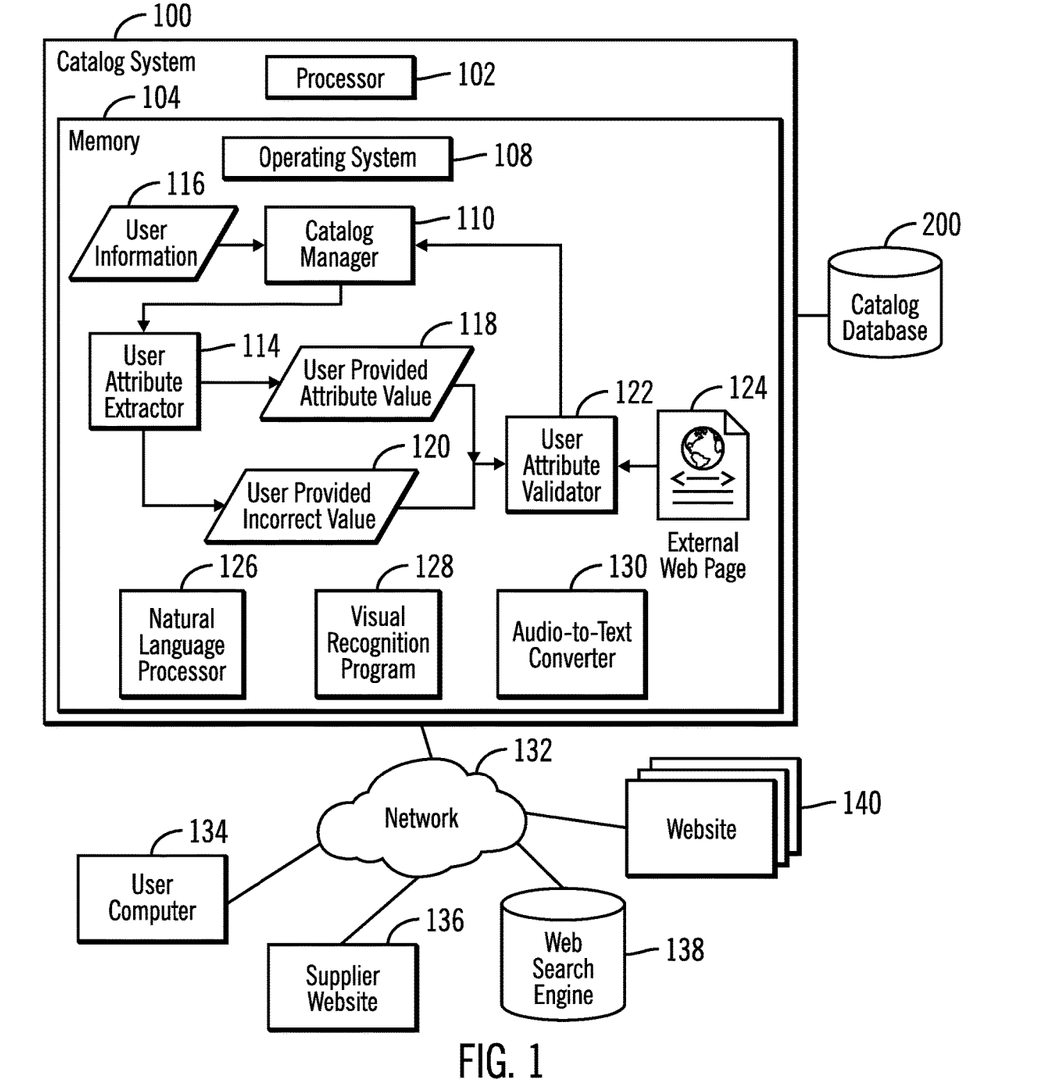
FIG. 1 illustrates an embodiment of a computing environment.

FIG. 1 illustrates an embodiment of a catalog system 100 in which embodiments are implemented. The catalog system 100 includes a processor 102 and a main memory 104. The main memory 104 includes various program components including an operating system 108; a catalog manager 110 managing access to a catalog database 200 having information on items, such as product items; a user attribute extractor 114 to process user information 116, in which a user indicates an error in the catalog database 200 information, to determine a user provided attribute value 118 having a user provided correct value for an item attribute in the catalog 200 and a user provided incorrect value 120 comprising the attribute value from the catalog 200 the user believes to be incorrect; and a user attribute validator 122 to validate, using external web pages 124, such as from a supplier of the item in the catalog having the incorrect attribute value 120 or located using a search for the item through an Internet search engine 138, to validate the user provided attribute value 118.

The memory 104 further includes a natural language processor (NLP) 126, a visual recognition program 128, and an audio-to-text convertor 130. The NLP 126, such as by way of example, the Watson™ Natural Language Understanding program, interprets the text in the user information 116 and external web pages 124 to determine NLP items classified as a correct attribute value 118 of the item and the noticed incorrect attribute value 120 from the catalog 200. The visual recognition program 128, such as by way of example, the Watson™ Visual Recognition program, analyzes images in the web page 124 for objects, faces, colors, explicit content, and other insight to generate text having attribute values for attributes of the analyzed image. The audio-to-text convertor 130, such as by way of example, the Watson™ Speech to Text program, analyzes an audio file and converts the audio to text. For instance, the user information 116 may comprise a phone call or voice recording in which the user states that a product item in the catalog 200 has incorrect attribute values, such as a wrong description of the product item, e.g., wrong color, wrong number of the items, wrong size, wrong functions, etc., and further indicates the attribute value they believe to be correct for the product item they received. The audio-to-text converter 130 may convert he audio format of the user information 116 to text to allow for further analysis by the user attribute extractor 114. (Watson is a trademark of International Business Machines Corporation throughout the world).

The user attribute extractor 114 may call the audio-to-text converter 130 to convert user information 116 comprising audio to text and may call the NLP 126 to interpret text from the user information 116 and determine a user provided attribute value 118 and user provided incorrect attribute value 120 in the user information 116. The user attribute validator 122 may call the visual recognition program 128 to determine text attribute values from any images included in an external web page 124 and call the NLP 126 to analyze and interpret the text in the external web page 124, including text determined by the visual recognition program 128, to validate the user provided attribute value 188 and user provided incorrect value 120.

The catalog system 100 communicates over a network 132, such as the Internet, with a user computer 134 providing the user information 116, a supplier website 136 that provides supplier web pages $124_S$ having information on a product item that is the subject of user information 116, and a web search engine 138 that maintains an index, such as a posting index, of web pages at web sites 140 that may have information on the product items in the catalog 200. The web search engine 138 may comprise a publicly available web search engine, such as Google®, Bing®, etc. (Google is a registered trademark of Google LLC and Bing is a registered trademark of Microsoft Corporation). The external web page 124 may be accessed from the supplier website 136 or from a web site 140 included in search results from the web search engine 138.

The supplier operating the supplier website 136 can be a manufacturer of the item, a distributor, retailer, wholesaler, intermediary distributor in the supply chain, etc.

The memory 104 may comprise suitable volatile or non-volatile memory devices.

Generally, program modules, such as the program components 108, 110, 114, 122, 126, 128, and 130 may comprise routines, programs, objects, components, logic, data structures, and so on that perform particular tasks or implement particular abstract data types. The program components and hardware devices of the catalog system 100 of FIG. 1 may be implemented in one or more computer systems, where if they are implemented in multiple computer systems, then the computer systems may communicate over a network.

The program components 108, 110, 114, 122, 126, 128, and 130 may be accessed by the processor 102 from the memory 104 to execute. Alternatively, some or all of the program components 108, 110, 114, 122, 126, 128, and 130 may be implemented in separate hardware devices, such as Application Specific Integrated Circuit (ASIC) hardware devices.

The functions described as performed by the programs 108, 110, 114, 122, 126, 128, and 130 may be implemented as program code in fewer program modules than shown or implemented as program code throughout a greater number of program modules than shown.

The arrows shown in FIG. 1 between the components 116, 110, 114, 118, 120, 122, 124 represent a data flow between the components.

The network 132 may comprise a Storage Area Network (SAN), Local Area Network (LAN), Intranet, the Internet, Wide Area Network (WAN), peer-to-peer network, wireless network, arbitrated loop network, etc.

The term "user" as used herein may refer to a person or computer process that consumes the information in the catalog 200 and generates the user information 116 to initiate the correction procedure.

Figure 2:
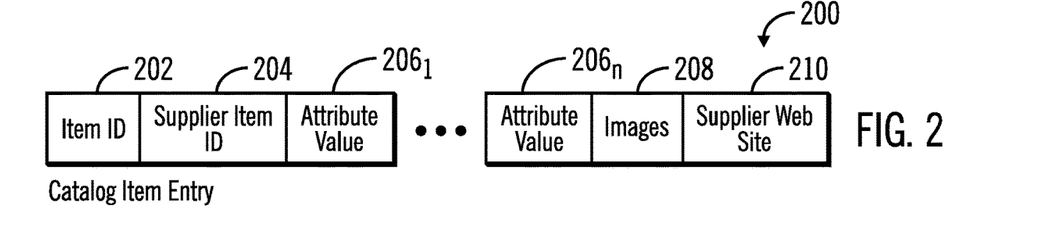
FIG. 2 illustrates an embodiment of a catalog item entry in a catalog database.

FIG. 2 illustrates an embodiment of an instance of a catalog item entry 200, having information on an item or product in the catalog database 200, and including: an item identifier (ID) 202 identifying the item in the catalog 200; a supplier item ID 204, such as a part number to identify the part with the supplier, such as a manufacturer, intermediary, etc.; one or more attribute values $206_1, \ldots 206_n$ providing values for attributes of the item, such as color, size, quantity, price, etc.; images 208 of the item; and a supplier web site 210 at which further information on the product can be obtained, which may comprise the specific page for the item 204 or a page in which the item 204 can be searched.

Figure 3:
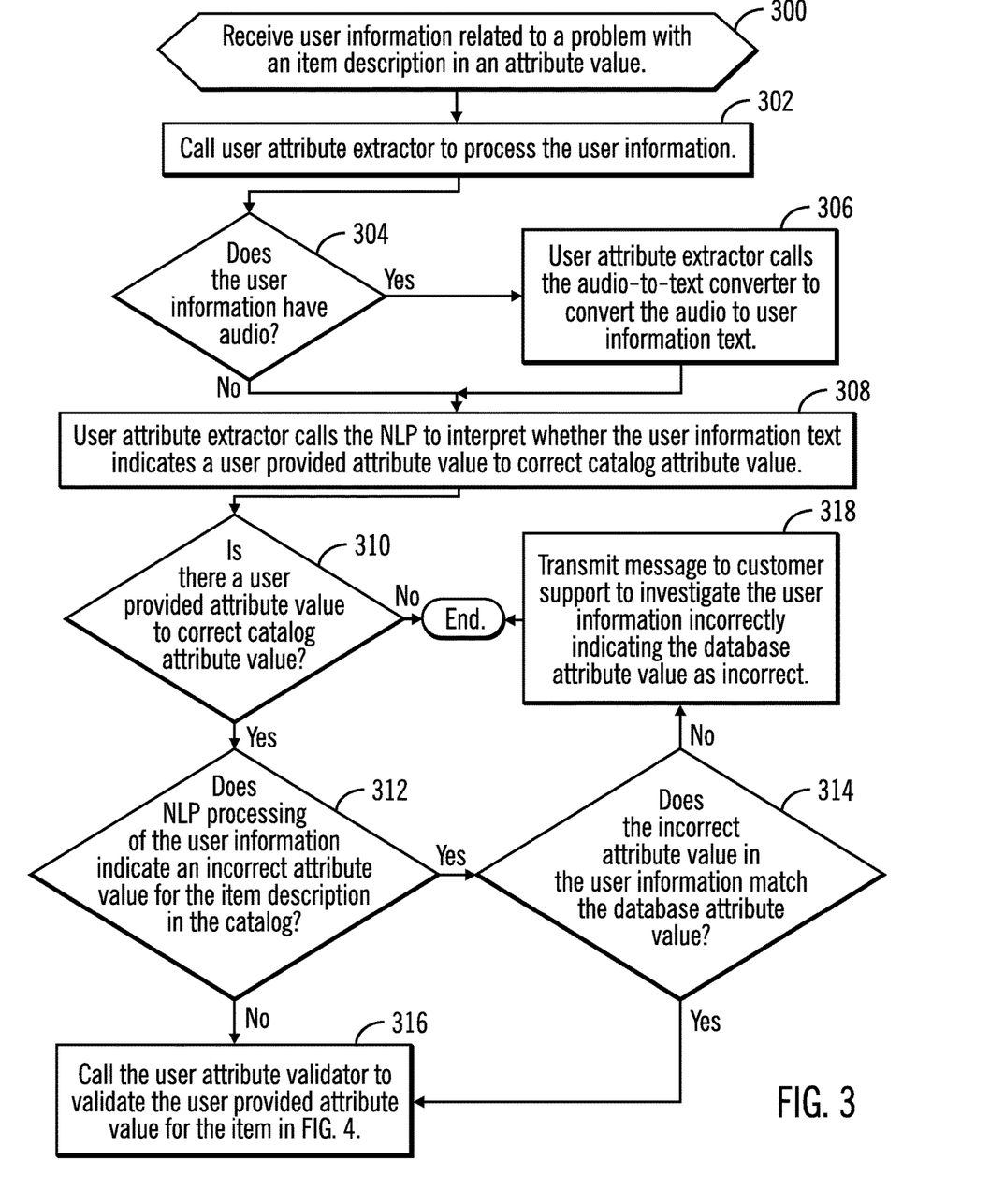
FIG. 3 illustrates an embodiment of operations to extract a user provided attribute value from user information for an item in the catalog database.

FIG. 3 illustrates an embodiment of operations performed by the catalog manager 110 and user attribute extractor 114 to extract user provided attribute values in the user information 116 in which the user may indicate that a database or catalog attribute value is incorrect and may provide what they believe to be the correct attribute value and the incorrect attribute value provided by the catalog item entry $200_i$ in the database 200. For instance, if the user is returning an item because it was not as described, such as they purchased an item described as red on the web site, and the shipped item was blue, then the user provided attribute value 118 would be blue and the user provided incorrect value 120, observed from the catalog 200 information, would be red. The user information 116 may be received at the catalog manager 110 through one of multiple communication channels, such as a voice recording through a phone, text via a messenger program, web site text interface or email. Upon receiving (at block 300) user information 116 related to a problem with an item description of an attribute value, the catalog manager 110 calls (at block 302) the user attribute extractor 114 to process the user information 116. If (at block 304) the user information 116 is comprised of audio, such as a voice recording, then the user attribute extractor 114 calls (at block 306) the audio-to-text converter 130 to convert the audio to text.

After converting audio to text (from block 306) or if (from the no branch of block 304) the user information 116 comprises text (in an electronic message, email, etc.), the user attribute extractor 114 calls the NLP 126 to interpret whether the user information 116 text indicates a user provided attribute value 118 to correct a catalog attribute value and the user provided incorrect value 120 that the user observed when purchasing. If (at block 310) the user information 116 text includes a user provided attribute value 118 and if (at block 312) the NLP 128 processing of the user information 116 indicates an incorrect attribute value 120 for the item description in the catalog entry $200_i$, then the user attribute extractor 114 determines (at block 314) whether the incorrect attribute value 120 from the user information 116 matches the database attribute value $206_i$, to verify that the user is providing correct information on errors in the catalog entry $200_i$. If (from block 314) the user provided the actual database attribute value $206_i$ as the incorrect attribute value 120 or if (at block 312) no incorrect attribute value 120 was identified in the user information 116, then the user attribute extractor 114 calls (at block 316) the user attribute validator 122 to validate the user provided attribute value for the item by confirming the user provided attribute value 118 with external information according to the operations in FIG. 4.

With the embodiment of FIG. 3, the user attribute extractor 114 is called to determine whether the user has provided information on incorrect attribute values for an item in a database, such as when returning an item. This determination may be made in real time when receiving user information 116 on incorrect catalog 200 information to allow for immediate analysis and real-time correction of the catalog 200 information to avoid misinformation and further product returns.

Figure 4:
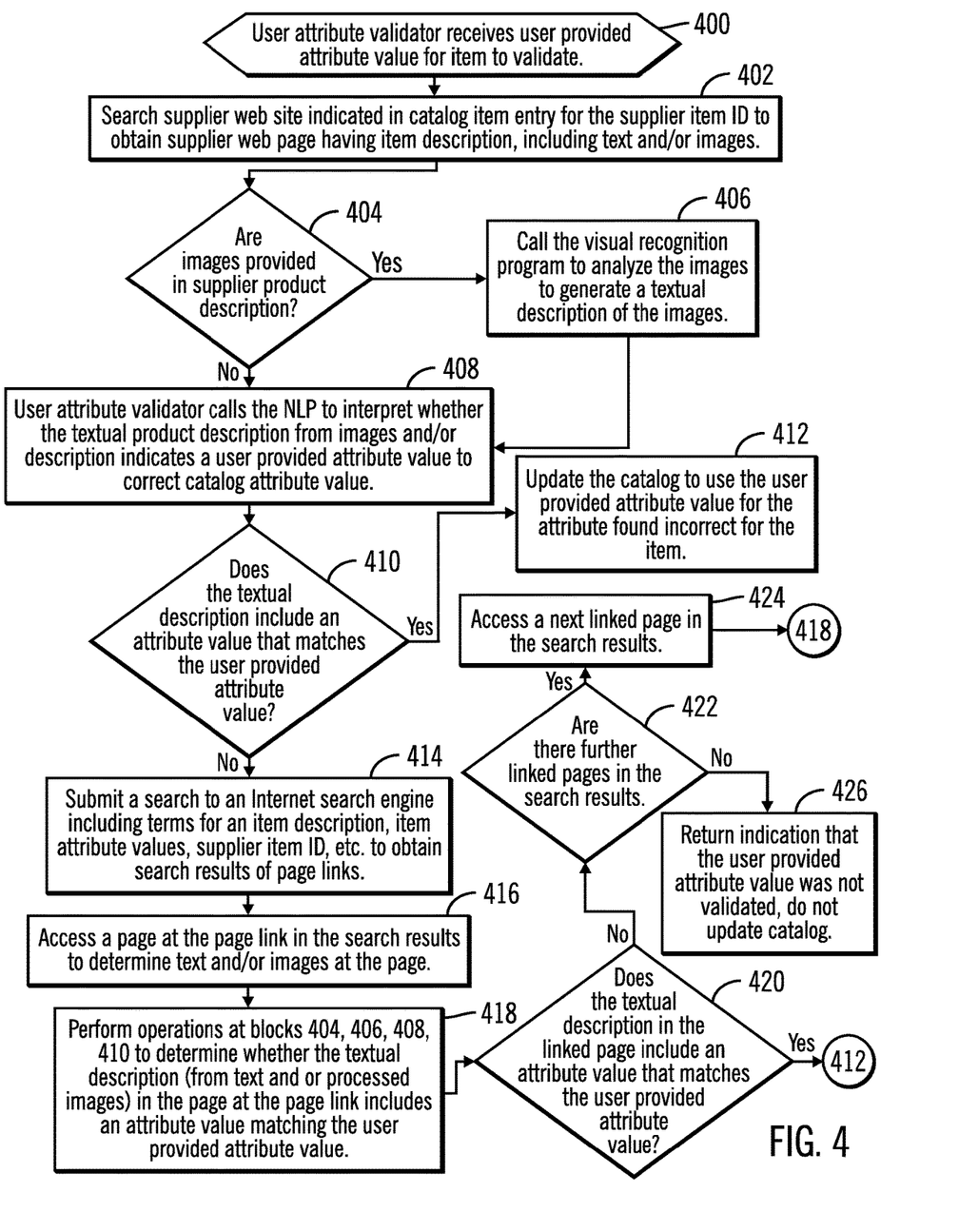
FIG. 4 illustrates an embodiment of operations to validate a user provided attribute value.

FIG. 4 illustrates an embodiment of operations performed by the user attribute validator 122 to validate a user provided attribute value 118 when called at block 316 in FIG. 3. Upon receiving (at block 400) a user provided attribute value 118 for an item to validate, the user attribute validator 122 searches (at block 402) a supplier website 136 indicated in catalog item entry 210 for the supplier item ID 204 to obtain the supplier web page $124_S$ having an item 204 description, including text and/or images. If (at block 404) images are provided in the supplier web page $124_S$, then the visual recognition program 128 is called (at block 4067) to analyze the images to generate textual descriptors, such as facets and attributes, of the images. After generating textual description of images (at block 406) or if there are no images in the text description in the supplier web page $124_S$ (from the no branch of block 404), the user attribute validator 122 calls (at block 408) the NLP 126 to interpret whether the textual product description from images and/or description in the web page $124_S$ indicates a user provided attribute value to correct a catalog attribute value, i.e., whether the supplier web page $124_S$ includes an attribute value matching that the user indicated in the user information 116. If (at block 410) the textual description from the web page $124_S$ has the user provided attribute value 118 for the item, then the catalog entry $200_i$ for the item is updated (at block 412) to use the user provided attribute value 118 for the attribute found incorrect for the item.

If (at block 410) the textual description from the supplier web page $124_S$ does not validate the user provided attribute value 118, then the user attribute validator 122 may, in certain embodiments, submit (at block 414) a search to an Internet web search engine 138 including search terms having an item description using item attribute values $206_1 \ldots 206n$, supplier item ID 204, and other information to obtain search results of page links. A page at a page link in the search results is accessed (at block 416) to determine text and/or images at the page 124. The user attribute validator 122 performs (at block 418) the operations at blocks 404, 406, 408, 410 to determine whether the textual description (from text and or processed images) in the page 124 at the page link in the search results includes an attribute value matching the user provided attribute value 118. If (at block 420) there is a match, then the user provided attribute value 118 is validated and control proceeds to block 412 to update the catalog entry $200_i$ for the item to use the user provided attribute value 118 of the attribute value $206_i$ having incorrect information. If (at block 420) there is no match of the user attribute value 118 in the page 124, then if (at block 422) there are further linked pages in the search results, one of the linked pages 124 not considered is accessed (at block 424) and control proceeds to block 418 to determine whether that next linked page 124 validates the user provided attribute value 118. If (at block 422) there are no further search result links to consider, then indication is returned (at block 426) that the user provided attribute value 118 was not validated and item catalog entry $200_i$ was not updated. The indication may comprise a message transmitted to customer support or an administrator to follow-up with the user that submitted the user information 116 on an incorrect attribute value as part of a product return or submission of incorrect information in the catalog 200.

With the operations of FIG. 4, user provided attribute values to correct values in a catalog 200 for an item are automatically validated when the user submits the information to determine whether the user provided attribute values can be confirmed by checking if they are described in information, such as a page, from the supplier website or another website having information on the item. This ensures that before the catalog is updated with user supplied corrections, the corrections are confirmed to avoid changing the catalog entry to have incorrect information. By providing immediate, real time validation of user provided corrections, the catalog may be corrected with correct information in a crowd sourcing fashion to provide immediate corrections to the catalog to have correct information and avoid continued mistakes made based on the incorrect information.

Figure 5:
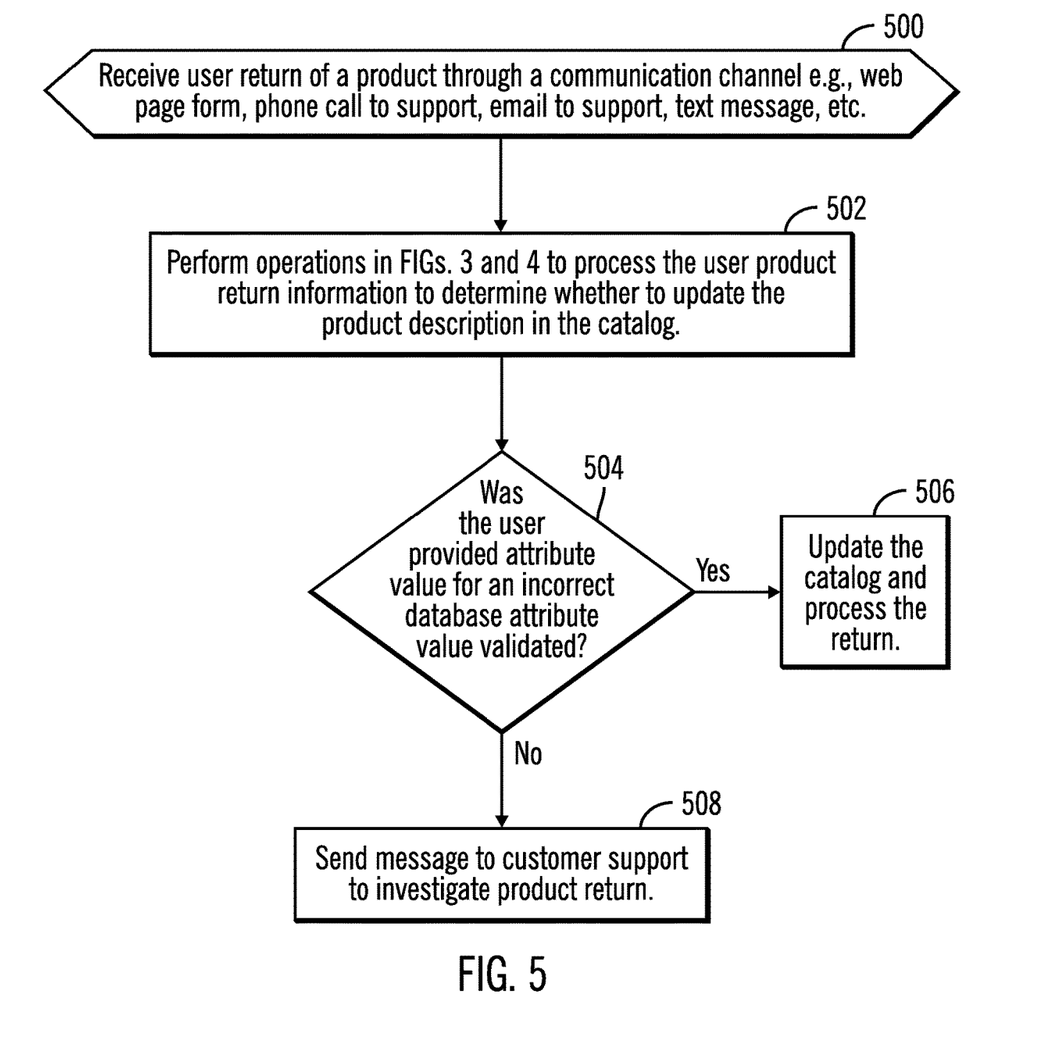
FIG. 5 illustrates an embodiment of operations to extract and validate a user provided attribute value to correct product information for a product return.

FIG. 5 illustrates an implementation of the components of FIG. 1 and operations of FIGS. 3 and 4 in an ecommerce retailer embodiment where the items and catalog 200 are for products being offered for sale and the user information 116 is supplied with a product return. Upon receiving (at block 500) a product return request with user information 116 on the reasons for the return from a communication channel, such as an Internet web page form, phone call to support, email to support, text message, etc., the catalog manager 110, user attribute extractor 114, and user attribute validator 122 perform the operations in FIGS. 3 and 4 to process the user product return information 116 to determine whether to update the product description in the catalog 200. If (at block 504) the user provided attribute value 118 was validated, then the catalog is updated (at block 506) and the return is processed as part of a return workflow process. If (at block 504) the user provided attribute value was not validated, such as at block 318 (FIG. 3) or block 426 (FIG. 4), then the catalog manager 110 sends (at block 508) a message to customer support to further investigate the product description in the catalog 200 and the return.

With the implementation of FIG. 5, the described embodiments may be used to provide real time validation of customer complaints of incorrect product descriptions in an online catalog to allow for immediate correction of the product description if the user corrections can be validated and confirmed.

The embodiments of FIGS. 1-4 may be used in implementations other than ecommerce, such as to process information from database consumers of errors in the database information, that may have information and attributes of content other than product items.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
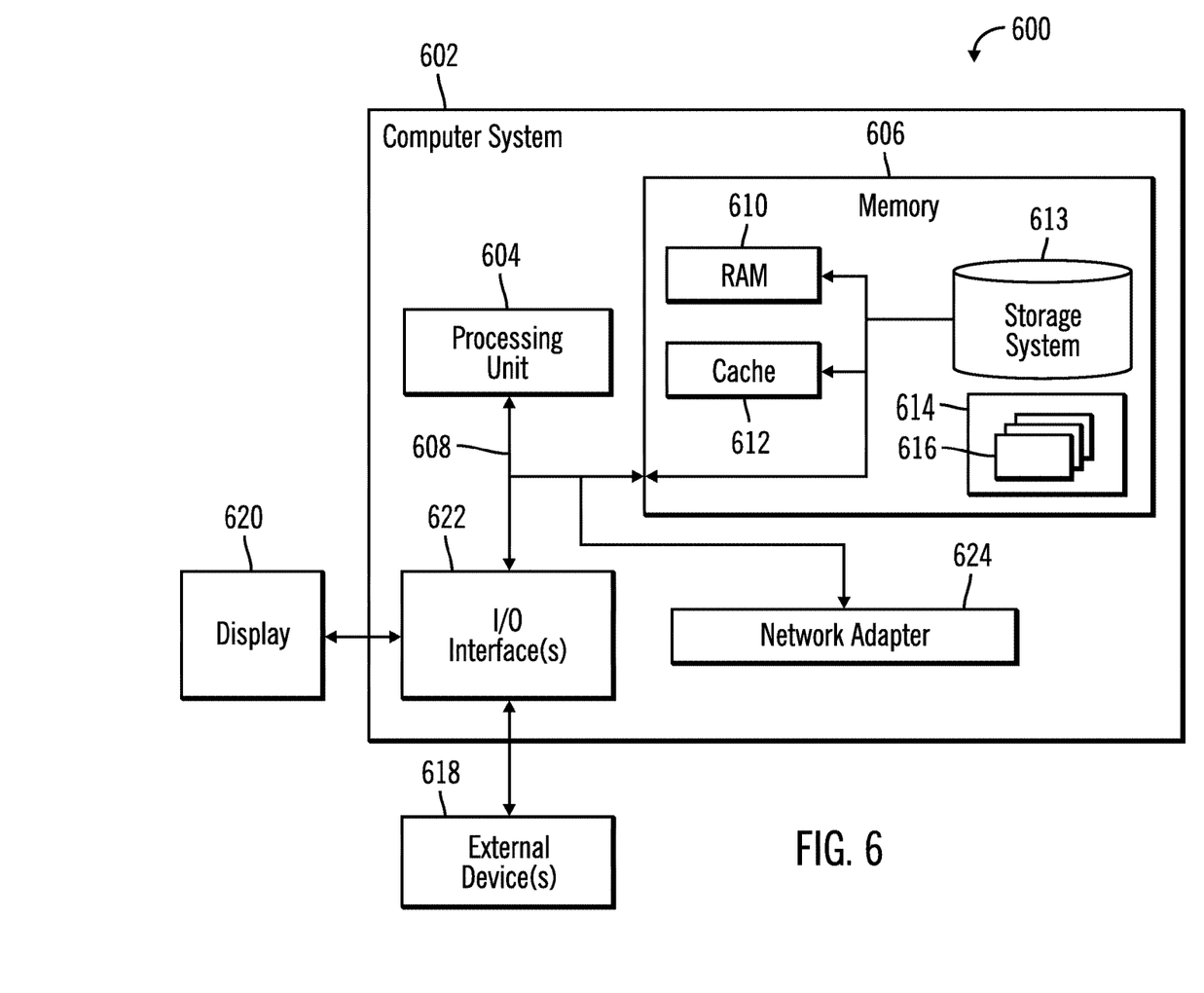
FIG. 6 illustrates a computing environment in which the components of FIG. 1 may be implemented.

The computational components of FIG. 1, including the catalog system 100, user computer 134, supplier website 136, web search engine 138, and web sites 140, may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for correcting a database, wherein the computer program product comprises a computer readable storage medium having program instructions embodied therewith that when executed cause operations, the operations comprising:
    receiving, from a user, user information indicating an incorrect database attribute value for an attribute of content in the database and indicating a user provided attribute value for the incorrect database attribute value;
    accessing a page from over a network providing information on the content in response to receiving the user information indicating the incorrect database attribute value, wherein the page is provided by a source web site providing information on the content independent of the user;
    determining whether the page includes a page attribute value for the attribute of the content;
    determining whether the page attribute value for the attribute of the content matches the user provided attribute value in response to determining that the page provides the page attribute value; and
    updating the database to use the user provided attribute value for the attribute of the content in response to determining that the page attribute value matches the user provided attribute value.

2. The computer program product of claim 1, wherein the user information comprises an audio recording from the user describing the incorrect database attribute value and the user provided attribute value, wherein the operations further comprise:
    converting audio in the audio recording to text; and
    performing natural language processing of the text converted from the audio to determine the user provided attribute value as a correct attribute value for the attribute of the content.

3. The computer program product of claim 1, wherein the page includes an image representing the content, wherein the operations further comprise:
    performing visual recognition analysis on the image, by a visual recognition module, to determine attribute values for attributes of the image; and
    determine whether one of the determined attribute values for the image matches the user provided attribute value, wherein the updating the database is performed in response to determining that one of the determined attribute values for the image matches the user provided attribute value.

4. The computer program product of claim 1, wherein the accessing the page from over the network comprises:
    submitting a search request having terms describing the content to an Internet search engine to obtain search results to the search request with links to pages;
    selecting links on the page to access linked pages;
    processing the linked pages for a page attribute value for the attribute indicated as having the incorrect database attribute value; and
    validating the user provided attribute value in response to determining that at least one of the linked pages includes a page attribute value that matches the user provided attribute value.

5. The computer program product of claim 1, wherein the content comprises representations of items and wherein the database provides a catalog of items having database attribute values for attributes of the items, wherein the operations further comprise:
    determining whether the user information indicates an incorrect attribute value in the catalog of an item; and
    determining whether the incorrect attribute value matches a database attribute value in response to determining that the user information indicates the incorrect attribute value, wherein the operations of accessing the page, determining whether the page includes a page attribute value, determining whether the page attribute value matches the user provided attribute value, and updating the database are performed in response to determining that the incorrect attribute value matches the database attribute value.

6. The computer program product of claim 5, wherein the operations further comprise:
    receiving a communication of a user return of an item, wherein the user information is included with the communication of the user return, and wherein the accessing the page and determining whether the page includes a page attribute value are performed in response to the user return of the item.

7. The computer program product of claim 1, wherein the content comprises representations of items and wherein the database provides a catalog of items having attribute values for attributes of the items, wherein the accessing the page from over the network comprises:
    accessing the page from at least one of a supplier website and by submitting a description of an item to an Internet search engine; and
    performing natural language processing of a textual description on the page to determine whether the textual description provides a page attribute value for the attribute of the item having the incorrect database attribute value, wherein the page attribute value is used to validate the user provided attribute value for the item.

8. The computer program product of claim 7, wherein the accessing the page from at least one of the supplier website and by submitting the description of the item to the Internet search engine comprises:
    first searching the supplier website for the page; and
    submitting the description of the item to the Internet search engine in response to determining that the textual description in the page from the supplier website does not provide a supplier attribute value for the attribute having the incorrect database attribute value.

9. The computer program product of claim 7, wherein the operations further comprise:
    calling a visual recognition program to generate a textual description of an image in the page in response to the page having an image for the item, wherein the natural language processing is performed on the textual description generated from the image of the item.

10. A system for correcting a database, comprising:
    a processor; and
    a computer readable storage medium having program instructions that when executed by the processor cause operations, the operations:

receiving, from a user, user information indicating an incorrect database attribute value for an attribute of content in the database and indicating a user provided attribute value for the incorrect database attribute value;

accessing a page from over a network providing information on the content in response to receiving the user information indicating the incorrect database attribute value, wherein the page is provided by a source web site providing information on the content independent of the user;

determining whether the page includes a page attribute value for the attribute of the content;

determining whether the page attribute value for the attribute of the content matches the user provided attribute value in response to determining that the page provides the page attribute value; and updating the database to use the user provided attribute value for the attribute of the content in response to determining that the page attribute value matches the user provided attribute value.

11. The system of claim 10, wherein the page includes an image representing the content, wherein the operations further comprise:

performing visual recognition analysis on the image, by a visual recognition module, to determine attribute values for attributes of the image; and determine whether one of the determined attribute values for the image matches the user provided attribute value, wherein the updating the database is performed in response to determining that one of the determined attribute values for the image matches the user provided attribute value.

12. The system of claim 10, wherein the accessing the page from over the network comprises:

submitting a search request having terms describing the content to an Internet search engine to obtain search results to the search request with links to pages; selecting links on the page to access linked pages;

processing the linked pages for a page attribute value for the attribute indicated as having the incorrect database attribute value; and validating the user provided attribute value in response to determining that at least one of the linked pages includes a page attribute value that matches the user provided attribute value.

13. The system of claim 10, wherein the content comprises representations of items and wherein the database provides a catalog of items having database attribute values for attributes of the items, wherein the operations further comprise:

determining whether the user information indicates an incorrect attribute value in the catalog of an item; and determining whether the incorrect attribute value matches a database attribute value in response to determining that the user information indicates the incorrect attribute value, wherein the operations of accessing the page, determining whether the page includes a page attribute value, determining whether the page attribute value matches the user provided attribute value, and updating the database are performed in response to determining that the incorrect attribute value matches the database attribute value.

14. The system of claim 10, wherein the content comprises representations of items and wherein the database provides a catalog of items having attribute values for attributes of the items, wherein the accessing the page from over the network comprises:

accessing the page from at least one of a supplier website and by submitting a description of an item to an Internet search engine; and performing natural language processing of a textual description on the page to determine whether the textual description provides a page attribute value for the attribute of the item having the incorrect database attribute value, wherein the page attribute value is used to validate the user provided attribute value for the item.

15. The system of claim 14, wherein the accessing the page from at least one of the supplier website and by submitting the description of the item to the Internet search engine comprises:

first searching the supplier website for the page; and submitting the description of the item to the Internet search engine in response to determining that the textual description in the page from the supplier website does not provide a supplier attribute value for the attribute having the incorrect database attribute value.

16. A method for correcting a database, comprising:

receiving, from a user, user information indicating an incorrect database attribute value for an attribute of content in the database and indicating a user provided attribute value for the incorrect database attribute value;

accessing a page from over a network providing information on the content in response to receiving the user information indicating the incorrect database attribute value, wherein the page is provided by a source web site providing information on the content independent of the user;

determining whether the page includes a page attribute value for the attribute of the content;

determining whether the page attribute value for the attribute of the content matches the user provided attribute value in response to determining that the page provides the page attribute value; and updating the database to use the user provided attribute value for the attribute of the content in response to determining that the page attribute value matches the user provided attribute value.

17. The method of claim 16, wherein the page includes an image representing the content, further comprising:

performing visual recognition analysis on the image, by a visual recognition module, to determine attribute values for attributes of the image; and determine whether one of the determined attribute values for the image matches the user provided attribute value, wherein the updating the database is performed in response to determining that one of the determined attribute values for the image matches the user provided attribute value.

18. The method of claim 16, wherein the accessing the page from over the network comprises:

submitting a search request having terms describing the content to an Internet search engine to obtain search results to the search request with links to pages; selecting links on the page to access linked pages;

processing the linked pages for a page attribute value for the attribute indicated as having the incorrect database attribute value; and validating the user provided attribute value in response to determining that at least one of the linked pages includes a page attribute value that matches the user provided attribute value.

19. The method of claim 16, wherein the content comprises representations of items and wherein the database provides a catalog of items having database attribute values for attributes of the items, further comprising:

determining whether the user information indicates an incorrect attribute value in the catalog of an item; and determining whether the incorrect attribute value matches a database attribute value in response to determining that the user information indicates the incorrect attribute value, wherein the accessing the page, determining whether the page includes a page attribute value, determining whether the page attribute value matches the user provided attribute value, and updating the database are performed in response to determining that the incorrect attribute value matches the database attribute value.

20. The method of claim 16, wherein the content comprises representations of items and wherein the database provides a catalog of items having attribute values for attributes of the items, wherein the accessing the page from over the network comprises:

accessing the page from at least one of a supplier website and by submitting a description of an item to an Internet search engine; and performing natural language processing of a textual description on the page to determine whether the textual description provides a page attribute value for the attribute of the item having the incorrect database attribute value, wherein the page attribute value is used to validate the user provided attribute value for the item.

21. The method of claim 20, wherein the accessing the page from at least one of the supplier website and by submitting the description of the item to the Internet search engine comprises:

first searching the supplier website for the page; and submitting the description of the item to the Internet search engine in response to determining that the textual description in the page from the supplier website does not provide a supplier attribute value for the attribute having the incorrect database attribute value.

\* \* \* \* \*